United States Patent
Lee (10) Patent No.: US 8,482,633 B2
(45) Date of Patent: Jul. 9, 2013

(54) APPARATUS AND METHOD FOR IMAGE PROCESSING USING SECURITY FUNCTION

(75) Inventor: Jang-won Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 326 days.

(21) Appl. No.: 12/911,909

(22) Filed: Oct. 26, 2010

(65) Prior Publication Data

US 2011/0096196 A1 Apr. 28, 2011

(30) Foreign Application Priority Data

Oct. 26, 2009 (KR) .................. 10-2009-0101731

(51) Int. Cl.
*H04N 5/76* (2006.01)

(52) U.S. Cl.
USPC .................. 348/231.3; 348/231.99

(58) Field of Classification Search
USPC ........... 348/231.99, 231.1–231.3, 333.01, 348/333.05; 375/240.26, 254
See application file for complete search history.

(56) References Cited

U.S. PATENT DOCUMENTS

| | | | |
|---|---|---|---|
| 2003/0206635 A1* | 11/2003 | Morley et al. | 380/269 |
| 2004/0066533 A1* | 4/2004 | Nakajima | 358/1.15 |
| 2004/0201751 A1* | 10/2004 | Bell et al. | 348/231.99 |
| 2008/0117295 A1* | 5/2008 | Ebrahimi et al. | 348/143 |
| 2008/0252593 A1* | 10/2008 | Fukuta | 345/156 |
| 2009/0268056 A1* | 10/2009 | Wu | 348/231.2 |

* cited by examiner

*Primary Examiner* — Kelly L Jerabek
(74) *Attorney, Agent, or Firm* — Drinker Biddle & Reath LLP (57) ABSTRACT

An image processing apparatus includes: a user input unit that converts input manipulation of a user into an input signal; a security setting unit that sets a security mode and a password based on the input signal; an imaging unit that captures an image and converts the image into image data; an encoding processor that encodes the image data in such a way that the image data is combined with the password and the image corresponding to image data is deformed when the image processing apparatus is set in the security mode by the security setting unit; and a storage unit that stores the image data.

19 Claims, 10 Drawing Sheets

EXIF : Exchangeable image file format
SOI : Start of image
APPI : Application marker segment 1
DQT : Define quantization table
DHT : Define huffman table
SOF : Start of frame
SOS : Start of scan EOI : End of image
IFD : Image file directory
TIFF : Tagged image file foramt

FIG. 6

| | |
|---|---|
| SOI | START OF IMAGE |
| DQT | DEFINE QUANTIZATION TABLE |
| DHT | DEFINE HUFFMAN TABLE |
| SOF | START OF FRAME |
| SOS | START OF SCAN |
| | COMPRESSED DATA |
| EOI | END OF IMAGE |

APPARATUS AND METHOD FOR IMAGE PROCESSING USING SECURITY FUNCTION

CROSS-REFERENCE TO RELATED PATENT APPLICATION

This application claims the priority benefit of Korean Patent Application No. 10-2009-0101731, filed on Oct. 26, 2009, in the Korean Intellectual Property Office, the disclosure of which is incorporated herein in its entirety by reference.

BACKGROUND

1. Field of the Invention

Embodiments relate to an apparatus and method for image processing using a security function, and more particularly, to an apparatus and method for image processing, wherein image data corresponding to an image captured in a security mode is encoded and the encoded image data is stored, so that even when the image data is transferred to an external apparatus, the image data is still secure.

2. Description of the Related Art

When a digital image processing apparatus is used to capture a desired image, if a user identifies a desired image and pushes a shutter button, the desired image is converted into a file and then the file of the desired image is stored. A picture generated by a digital image processing apparatus can be seen using either a display device included in the digital image processing apparatus or an external device such as a personal computer.

In some cases, a picture generated by a digital image processing apparatus may be disclosed so that many people see the picture together. However, high demand for high privacy has led to the introduction of a security function allowing a user alone to see the picture on the digital image processing apparatus.

According to a security function used in commercially available digital image processing apparatuses, a captured image is stored, and when the stored image is reproduced, a user authentication operation is performed, and only when the user is authenticated, the image is reproduced.

However, since the security function used in commercially available digital image processing apparatuses operates only in digital image processing apparatuses in which the image is stored, once the image is transferred to an external device, anyone can see the image and the user's privacy is not completely protected.

SUMMARY

An apparatus and method for image processing using a security function enable an image to continue to be protected even after the image is transferred to outside the image processing apparatus by maintaining a security function.

In an embodiment of the apparatus and method for image processing, image data corresponding to an image captured in a security mode is encoded and the encoded image data is stored.

The apparatus may include a user input unit that converts input manipulation of a user into an input signal; a security setting unit that sets a security mode and a password based on the input signal; an imaging unit that captures an image and converts the image into image data; an encoding processor that encodes the image data in such a way that the image data is combined with the password and the image corresponding to image data is deformed when the image processing apparatus is set in the security mode by the security setting unit; and a storage unit that stores the image data.

The image processing apparatus may further include a display unit that displays images corresponding to image data stored in the storage unit, wherein the encoding processor encodes the image data in such a way that image data corresponding to at least some of the images displayed by the display unit is combined with the password, and images corresponding to the image data are changed.

The image processing apparatus may further include a compression processor that generates compressed image data by compressing the image data, wherein the compressed image data is stored in the storage unit. The image processing apparatus may further include a display unit that displays an image, wherein the compression processor extracts the compressed image data to generate image data, and when the image data is encoded, the security setting unit compares an input signal transmitted by the user input unit with the password of the image data, and when the input signal matches the password, the encoding processor decodes the encoded image data and the display unit displays an image corresponding to the decoded image data.

The image data may include a user region and an image region, and the password may be stored in the user region of the image data.

The encoding processor may add deformation data to the image region to encode the image data.

The encoding processor may subtract the deformation data from the image region of the image data to decode the encoded image data.

The encoding processor may divide an image corresponding to the image region into sub-regions and change locations of the sub-regions to encode the image data.

The encoding processor may restore locations of the sub-regions to decode the encoded image data.

The image data may further include a reduced image region that stores a reduced image generated by reducing a size of an image corresponding to the image region, wherein when the image data is encoded by the encoding processor, the image corresponding to the image region is deformed and the reduced image corresponding to the reduced image region is maintained.

The image data may further include a reduced image region that stores a reduced image generated by reducing a size of an image corresponding to the image region, wherein when the image data is encoded by the encoding processor, the image corresponding to the image region is deformed and the reduced image corresponding to the reduced image region is deformed.

The image data may be encoded by the encoding processor in such a way that the reduced image region includes hint information for remembering the password.

An image processing method may include: setting a security mode and a password; converting a captured image into image data; when the security mode is set, encoding the image data in such a way that the image data is combined with the password and an image corresponding to the image data is deformed; and storing the image data.

BRIEF DESCRIPTION OF THE DRAWINGS

The above and other features and advantages will become more apparent by describing in detail exemplary embodiments with reference to the attached drawings in which.

DETAILED DESCRIPTION

Hereinafter, the structure and operation of embodiments of an apparatus and method for image processing using a security function will be described in detail with reference to the attached drawings.

Figure 1:
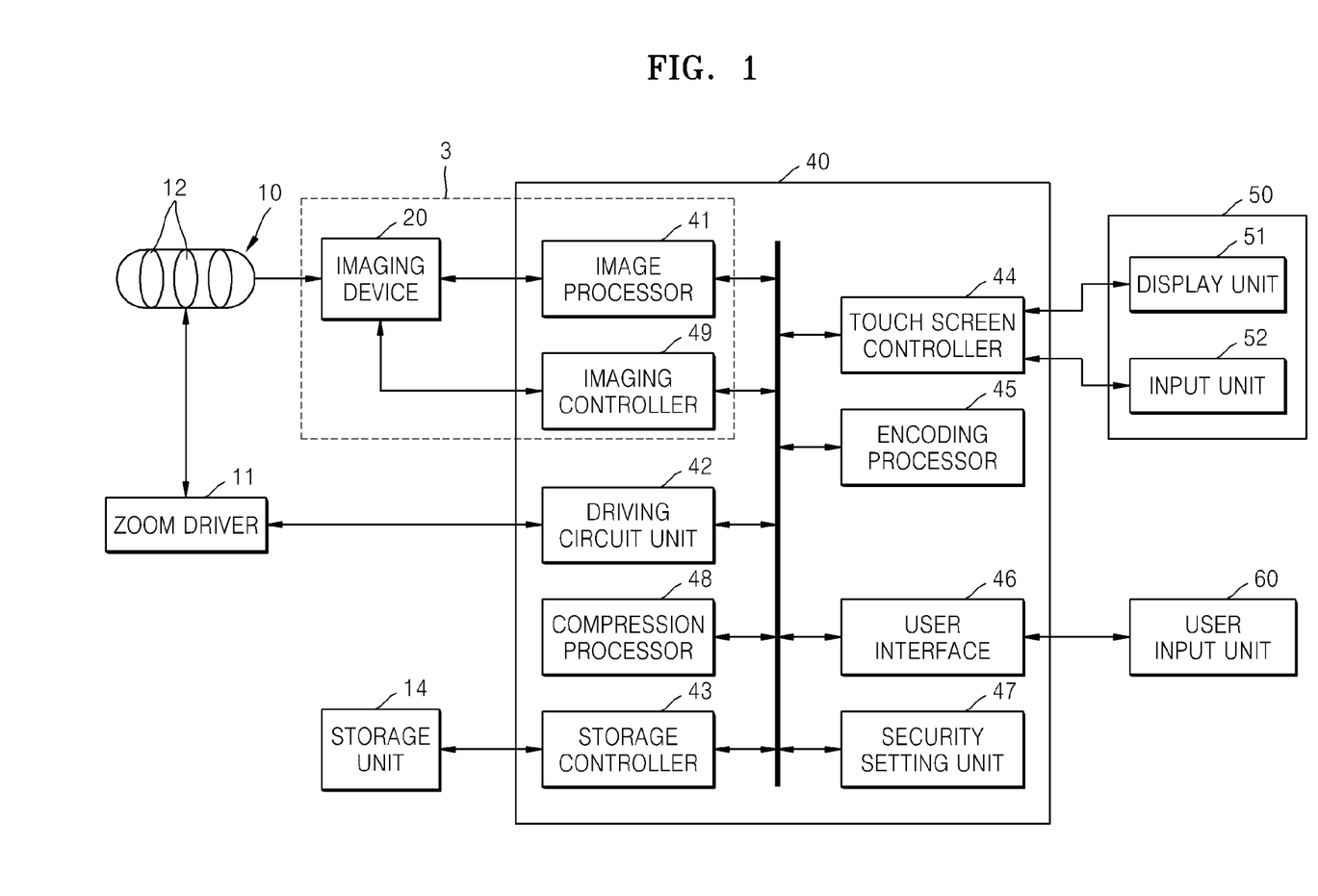
FIG. 1 is a block diagram illustrating relationships among constituents of an image processing apparatus using a security function, according to an embodiment.

FIG. 1 is a block diagram illustrating relationships among constituents of an image processing apparatus using a security function, according to an embodiment.

Referring to FIG. 1, the image processing apparatus according to the present embodiment includes a user input unit 60 that receives input manipulation of a user, a security setting unit 47 that sets a security mode and a password, an imaging unit 3 that captures an image, an encoding processor 45 that encodes image data, and a storage unit 14 that stores image data.

When an image processing apparatus having the structure described above is used, even when image data that is encoded in a security mode is transferred to outside the image processing apparatus, a security function of the image data is maintained and thus a user's privacy may be more effectively protected.

The imaging unit 3 includes an imaging device 20 that captures the image of a subject and converts the captured image into an electrical signal, an image processor 41 that converts the electrical signal transmitted by the imaging device 20 into image data, and an imaging controller 49 that controls operation of the imaging device 20. The image light of a subject is incident to the imaging device 20 through an optical system 10 disposed before the imaging device 20.

The optical system 10 disposed before the imaging device 20 includes a plurality of lenses 12, and forms an image on an imaging surface of the imaging device 20 by using external image light. The lenses 12 are disposed such that intervals therebetween are changeable. By changing the intervals of the lenses 12, a zoom magnification and a focus of the optical system 10 may be controlled.

The lenses 12 are driven by a zoom driver 11 having a driving unit, such as a zoom motor, for changing the relative locations of the lenses 12. The lenses 12 may include a zoom lens that enlarges or reduces a size of the image of a subject, and a focus lens that controls focusing of a subject. The zoom driver 11 is driven in correspondence to a control signal applied by a driving circuit unit 42 of a controller 40. Thus, the zoom driver 11 may drive the optical system 10 so that the optical system 10 has any one of a plurality of enlargement magnifications.

The imaging device 20 may include a photoelectric conversion device such as a charge-coupled device (CCD) or a complementary metal-oxide semiconductor (CMOS), and converts an image light that enters through the optical system 10 into an electrical signal. The imaging device 20 is driven in correspondence to a control signal applied by the imaging controller 49.

The image processor 41 converts an electrical signal transmitted by the imaging device 20 into image data that may be stored in a storage medium or may be image processed.

The electrical signal transmitted by the imaging device 20 may be converted by the image processor 41 according to the following method. For example, the method may include: reducing driving noise of the electrical signal transmitted by the imaging device 20 by using a correlated double sampling (CDS) circuit; adjusting the gain of a signal obtained after noise is reduced, wherein the adjusting is performed by an automatic gain control circuit (AGC) circuit; converting an analog signal into a digital signal by using an analog-to-digital (A/D) converter; and performing any of correction for pixel defects with respect to a digital signal, gains correction, white balance correction, and gamma correction. The CDS circuit, the AGC circuit, and the A/D converter may be independent circuits.

The image processor 41 may convert the electrical signal of the imaging device 20 into RGB data and then convert the RGB data into raw data such as a YUV signal including a luminescence Y signal and a color difference UV signal.

The controller 40 is electrically connected to the imaging device 20, the zoom driver 11, a touch screen 50, the user input unit 60, and the storage unit 14. The controller 40 exchanges control signals with these elements in order to control operation of the elements and processes data.

The controller 40 may include the image processor 41, the driving circuit unit 42, a touch screen controller 44, the imaging controller 49, a user interface 46, the encoding processor 45, a compression processor 48, and the security setting unit 47. The controller 40 may also include a storage controller 43 that controls storage of data in the storage unit 14.

The controller 40 may be embodied as a microchip or a circuit board including a microchip, and constituents of the controller 40 may be embodied by software or circuits installed in the controller 40. The storage controller 43 controls writing of data to the storage unit 14 and reading of the written data or set information.

The storage unit 14 may include a volatile internal memory. The volatile internal memory may include a semiconductor memory device such as a synchronous dynamic random access memory (SDRAM). The storage unit 14 may perform a buffer memory function for temporarily storing raw data generated by the image processor 41 and an operation memory function that is used when the image processor 41 processes data.

The storage unit 14 may also include a non-volatile external memory. The non-volatile external memory may be, for example, a memory stick, a flash memory such as secure digital (SD)/multimedia card (MMC), a storage device such as a hard disk drive (HDD), or an optical storage device such as a DVD or CD. The storage unit 14 may store image data that is compressed in the form of a JPEG file or a TIFF file by the compression processor 48.

The image processing apparatus according to the present embodiment may include the touch screen 50 that includes a display unit 51 that displays an image corresponding to image data and an input unit 52 that selects a portion of the image displayed by the display unit 51. The touch screen 50 may display an image captured by the imaging device 20 and generate a signal corresponding to a touched location by sensing the touch on a surface of the touch screen 50.

The touch screen 50 is an input device combining the functionality of a keyboard and a mouse with a display. Since the touch screen 50 facilitates a user directly touching the surface of a display with a finger or a pen in order to perform a desired operation, the user may perform desired operations under a graphic user interface (GUI) environment.

The display unit 51 of the touch screen 50 may be a display device such as a liquid crystal display (LCD) or an organic light-emitting display (OLED). The display unit 51 may display an image corresponding to image data stored in the storage unit 14.

The input unit 52 may be installed on a surface of the display unit 51 and senses a touch of the surface of the display unit 51. The input unit 52 may be an example of the user input unit 60 included in the image processing apparatus according to the present embodiment. The input unit 52 may include a resistance sensing unit, a capacitive sensing unit, a sensing unit using a surface acoustic wave, a sensing unit using infrared (IR) rays, or an optical sensing unit.

By contacting the input unit 52 of the touch screen 50, a user may select a menu in an image displayed by the display unit 51 and perform an associated operation, or the user may designate an identified region.

The image processing apparatus may include the user input unit 60 that is formed separately from the touch screen 50. The user input unit 60 may be embodied as, for example, menu buttons or a dial. A user may manipulate the user input unit 60 in order to perform a security mode and input a password, e.g., when reduced images are displayed by the display unit 51. The user input unit 60 generates an input signal by recognizing manipulation of a user, and applies the generated input signal to the user interface 46.

The security setting unit 47 sets and identifies a security mode and a password based on user's input manipulation that is input through the user input unit 60. Under the security mode, an image captured by a user using an image processing apparatus is set with a password and thus disclosure of the image is prevented.

After the image processing apparatus is set in a security mode by the security setting unit 47, image data that is generated by the imaging unit 3 may include a password. Also, the image data generated in the security mode is encoded, and thus an image corresponding to the image data is not seen until a password that is input for decoding matches the password that has been set in advance.

When the image processing apparatus is set with the security mode by the security setting unit 47, the encoding processor 45 may combine the image data with a password and may encode the image data to change the image corresponding to the image data. The encoding processor 45 may encode image data generated by the imaging unit 3 or image data stored in the storage unit 14 according to selection of a user.

The encoding processor 45 may decode the encoded image data. The decoding of the image data may be performed when a password that is input through the user input unit 60 matches the password of the image data.

The compression processor 48 may compress image data generated by the imaging unit 3 or extract the compressed image data. The image data may be compressed in the form of a JPEG file or a TIFF file. JPEG is an image compression standard set by the Joint Photographic Experts Group, and is a file format that is widely used to compress a still image such as a photo due to its high compression efficiency.

Figure 2:
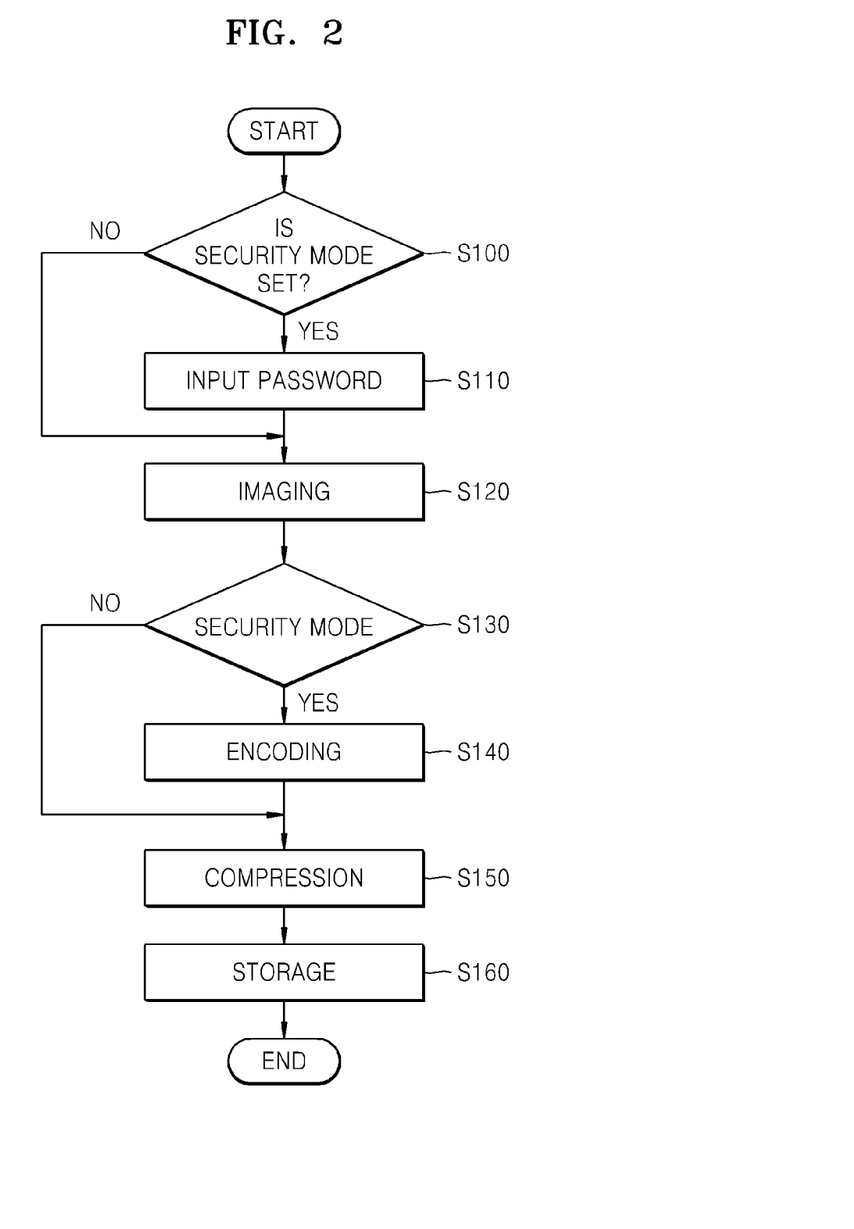
FIG. 2 is a flowchart illustrating operations of an image processing method using a security function, according to an embodiment.

FIG. 2 is a flowchart illustrating operations of an image processing method using a security function, according to an embodiment.

Referring to FIG. 2, the image processing method according to the present embodiment may include security setting operations (S100 and S110), an imaging operation (S120), an encoding operation (S140), and a storing operation (S160). The image processing method may also include a compression operation (S150) between the encoding operation (S140) and the storing operation (S160).

The security setting operations (S100 and S110) include setting a security mode and determining whether a security mode is set (S100), and setting a password (S110). If the security mode is determined to be set, a password is set by inputting a desired password (S110). If the security mode is set (S130), image data, which is generated by imaging after the security mode is set (S120), is encoded using the password (S140). The password may be a number that is directly input by a user or a number that has been set in advance. The password may be a combination of numbers and letters. After the image is encoded (S140), the image may be compressed (S150) and then stored to a file (S160). If a security mode is determined to not be set (S100, S130), then no password may be set before an image is generated (S120) and the image may be compressed (S150) and stored (S160) without first being encoded for security using a password.

According to the image processing method described above, the encoding is performed immediately after the image data is obtained. However, according to another embodiment, image data that has been stored in a storage unit may also be encoded. To perform the encoding later, the image processing method may further include displaying images of image data stored in the storage unit, and image data corresponding to at least some of the images displayed is encoded (S140 of FIG. 2).

Figure 3:
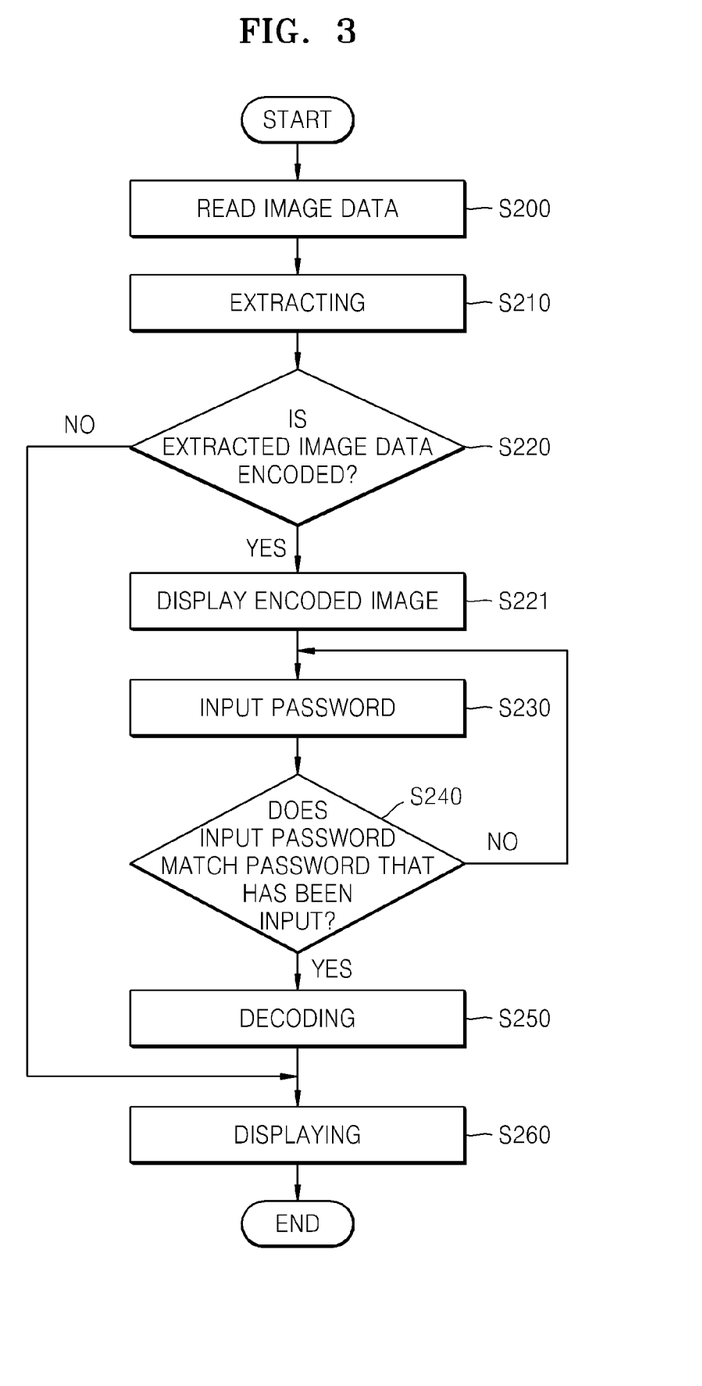
FIG. 3 is a flowchart illustrating operations of an image display method using a security function, according to an embodiment.

FIG. 3 is a flowchart illustrating operations of an image display method using a security function, according to an embodiment.

The image processing method according to the present embodiment may further include an image display method as illustrated in FIG. 3 in order to decode the encoded image data and display an image corresponding to the decoded image data on the display unit. That is, the image processing method may further include decoding image data that is encoded and stored in the storage unit (S250), and displaying an image corresponding to the encoded image data (S260).

The image processing method may include reading image data stored in the storage unit (S200) and extracting the compressed image data (S210). If the extracted image data is encoded (S220), an image corresponding to the encoded image data is displayed (S221), and if the extracted image data is not encoded (S220), an image corresponding to the image data is displayed (S260).

After an encoded image is displayed (S221) because the extracted image data is encoded, an input password is received (S230) and the input password is compared with the password of the image data (S240). When these passwords match each other, the encoded image data is decoded (S250).

If the input password is different from the password of the image data, a new password continues to be input (S230). When the encoded image data is decoded (S250), an image corresponding to the image data may be displayed (S260).

Figure 4:
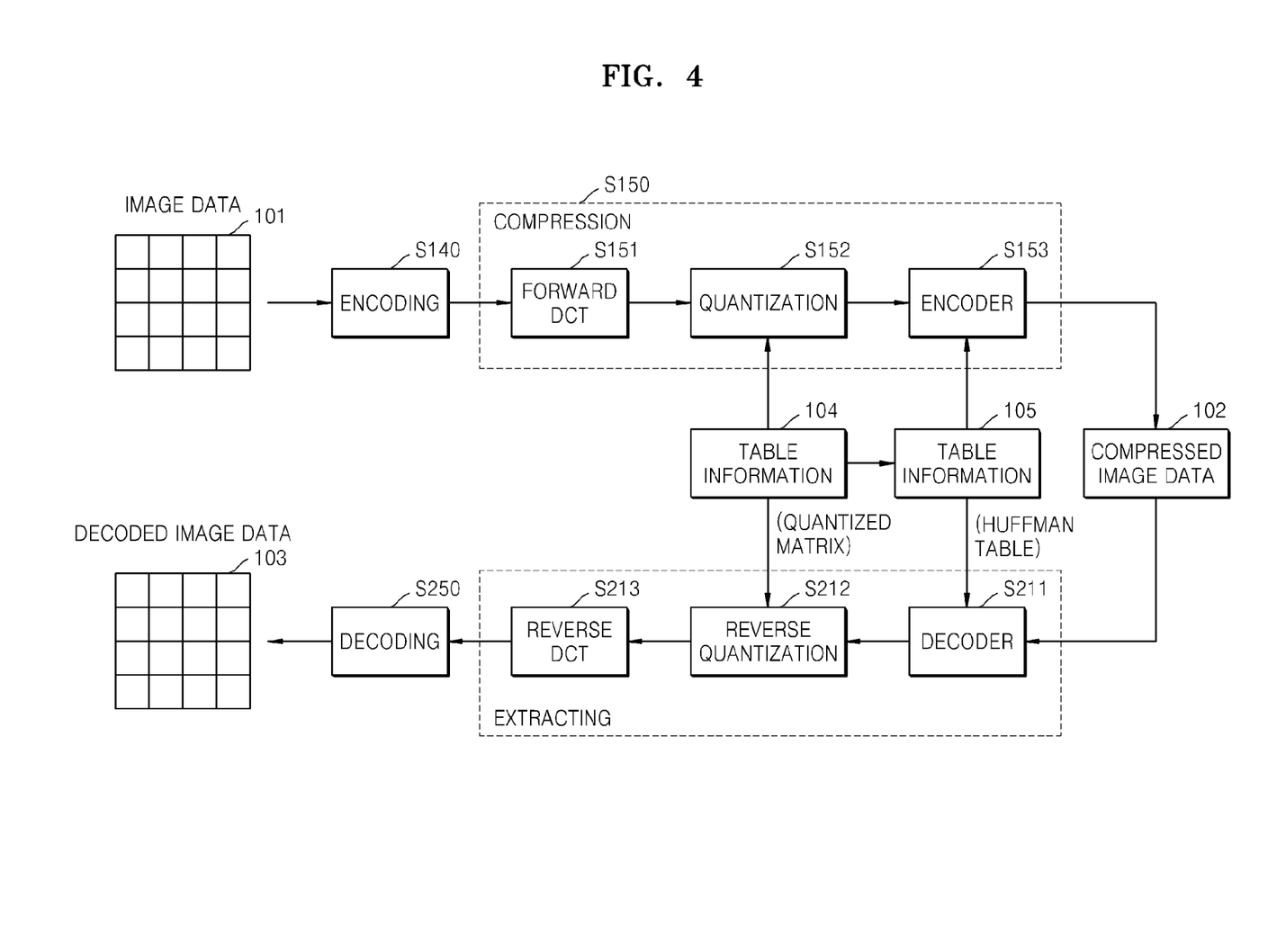
FIG. 4 is a conceptual block diagram illustrating encoding operation (S140), a compression operation (S150), an extraction operation (S210), and a decoding operation (S250) in the image processing methods of FIGS. 2 and 3.

FIG. 4 is a conceptual block diagram illustrating an encoding operation (S140), a compression operation (S150), an extraction operation (S210), and a decoding operation (S250) included in the image processing methods of FIGS. 2 and 3.

The encoding operation (S140) and the compression operation (S150) illustrated in FIG. 4 are included in the image processing method of FIG. 2. In the encoding operation (S140), image data 101 that is generated by the imaging operation (S120) or stored by the storing operation (S160) is encoded.

After the image data 101 is encoded, the compression operation (S150) is performed. During the compression operation (S150), a forward DCT operation (S151) that performs a discrete cosine transform (DCT) process on image data, a quantization processing operation (S152), and an encoding operation (S153) that performs a Huffman coding may be sequentially performed.

In the quantization processing operation (S152), the compression rate of image data is controlled based on quantized coefficient table information 104. In the encoding operation (S153), variable length encoding is performed on image data based on Huffman table information 105 in order to generate compressed image data 102 in the form of a JPEG file.

The decoding operation (S250) may be performed after the compressed image data 102 is extracted (S210). The extracting operation (S210) may include a decoding operation (S211) in which a Huffman coding, which may use the Huffman table information 105, is performed on the compressed image data 102. The extracting operation (S210) may also include a reverse quantization operation (S212) that is performed based on quantized coefficient table information 104, and a reverse DCT operation (S213) in which the reversely quantized data is inversely discrete-transformed.

Figure 5:
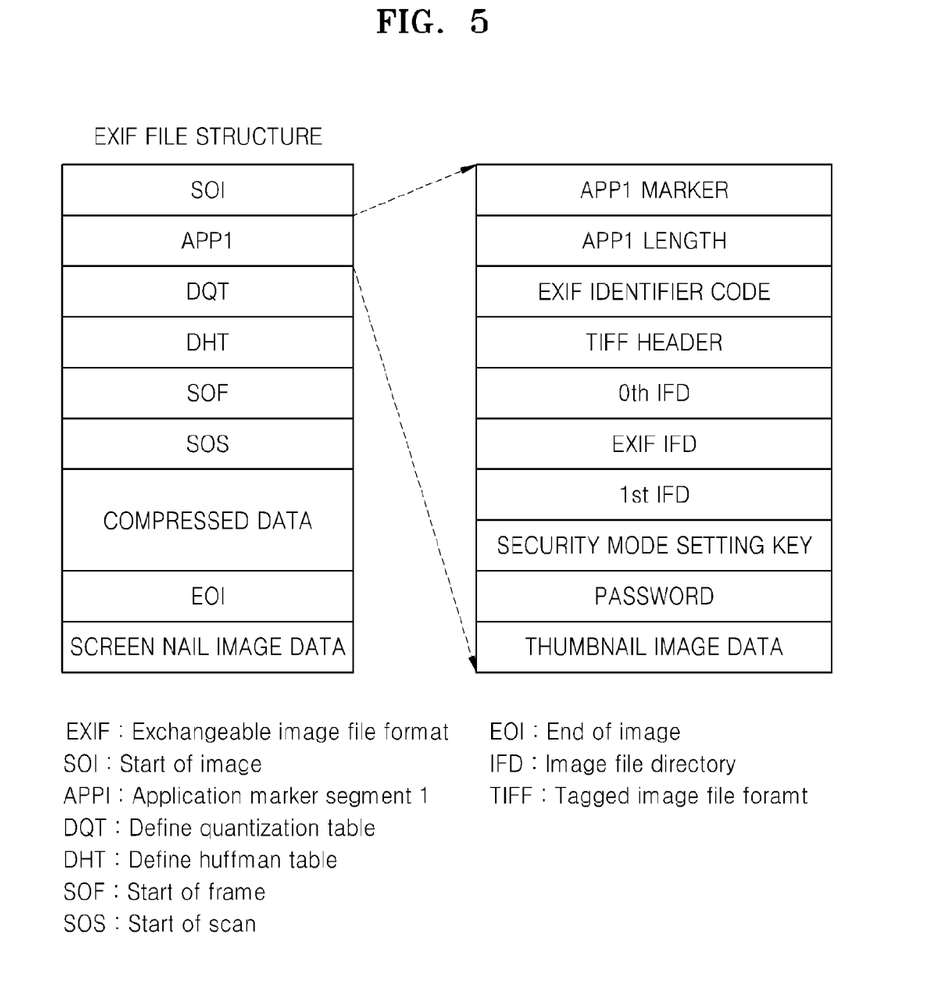
FIG. 5 illustrates a file structure of image data generated by using the image processing method using a security function of FIG. 2.
Figure 6:
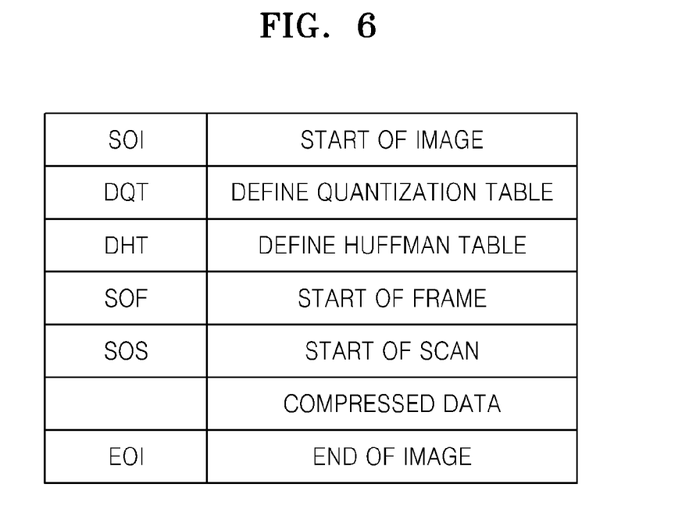
FIG. 6 illustrates a file structure of thumbnail image data included in the file structure of FIG. 5.

FIG. 5 illustrates a file structure of image data generated by using the image processing method using a security function of FIG. 2, and FIG. 6 illustrates a file structure of thumbnail image data included in the file structure of FIG. 5. FIGS. 5 and 6 illustrate structures of an exchangeable image file format (Exit) file as an example of image data.

As for digital pictures, images are recoded together with various information obtained at the time when imaging is performed, for example, a type of camera used, sensitivity, exposure information, or imaging data, and this information is stored in a portion of an image file. Thus, later, accurate information about the captured image is provided, a keyword-type search function using the information is provided, and images are easily managed in connection with an image database.

This kind of file format is referred to as Exif. That is, the Exif is a storage format of an image file obtained with a digital camera or a digital camcorder. The Exif is an image format that was standardized by the Japan electronic industry development association (JEIDA), is based on TIFF and JPEG, which are widely used, and includes unique information and operation regulations for digital cameras.

Since Exif information includes, in addition to image data, additional text information such as a shooting date, and reduced images such as a thumbnail or a screennail, image files may be efficiently managed using such information.

Exif information includes information about color, an image, size, and data compression, a maker's name, a model name of an input device, a driver of a device used, and software. In addition, Exif information may also include various other information such as a manufacturer, a model name, a shooting date, a shutter speed, an iris value, or use of a flash.

Exif may include the following data.
Start of image (SOI)
Application marker segment 1 (APP1)
Define quantized table (DQT)
Define Huffman table (DHT)
Start of frame (SOF); standardized DCT compression or progressive DCT compression
Start of Scan (SOS); encoded image data
Compressed data
End of image (EOI)

An APP1 region may include additional information such as a shooting date of the compressed image data or a model name, or information about a thumbnail image. The thumbnail image included in the APP1 region may have the same format illustrated in FIG. 6, and the screennail image may also have the same format illustrated in FIG. 6.

Image data that is processed by an apparatus and methods for image processing according to various embodiments may include a user region and an image region. The user region may include an APPI region, and the image region may include SOI, DQT, DHT, SOF, SOS, compressed data, and EOI. The APP1 region may include a security mode setting key that may include information about whether image data is encoded.

The APP1 region may also include a password that is input by a user or is set in an image processing apparatus in advance. During encoding, a password may be combined with the user region of the image data, and during decoding, the password of the user region may be compared with a password that is input by a user. Also, when image data is encoded, the image region may be deformed.

Figure 7:
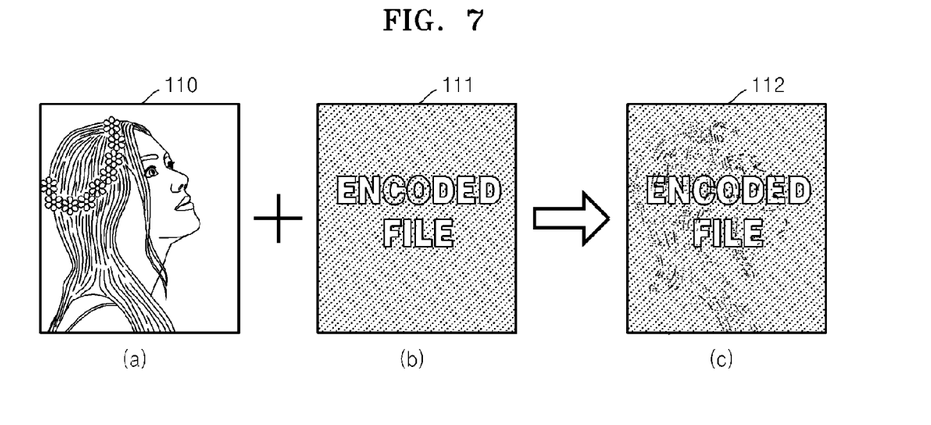
FIG. 7 is a conceptual view for explaining an encoding operation of the image processing method of FIG. 2.

FIG. 7 is a conceptual view for explaining an encoding operation of the image processing method of FIG. 2.

Information about an original image 110 is stored in the image region of image data. When the image data is encoded, deformation data corresponding to a deformed image 111 is added to the image region in which the original image 110 has been stored. When the image data is encoded by the deformation data addition, an encoded image 112 is generated and stored in the image region.

If functions representing data of pixels included in the original image 110 are defined by $I_1(x, y)$, and functions representing data of pixels included in the deformed image 111 that is used to encode the original image 110 are defined by $I_2(x, y)$, each pixel of the encoded image 112 may be represented by $O(x, y)$:

$$O(x,y)=I_1(x,y)+I_2(x,y) \quad \text{[Equation 1]}$$

Thus, once the image data is encoded, a user may not be allowed to see the original image 110 until the encoded image data is decoded, and may see only the encoded image 112.

Figure 8:
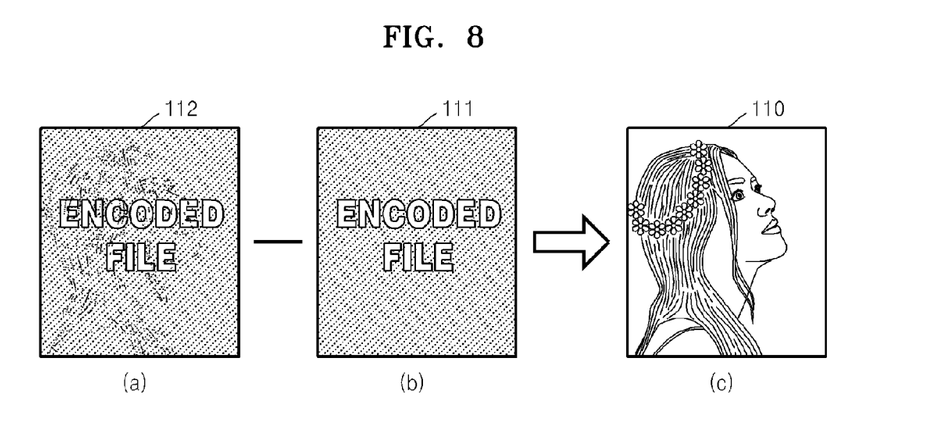
FIG. 8 is a conceptual view for explaining a decoding operation of the image processing method of FIG. 3.

FIG. 8 is a conceptual view for explaining a decoding operation of the image processing method of FIG. 3.

When the encoded image data is decoded, deformation data of the deformed image 111 is subtracted from the encoded image data corresponding to the encoded image 112. Thus, when the decoding is performed, the original image 110 may be obtained.

The subtraction may be represented by Equation 2, which is obtained using Equation 1:

$$I_1(x,y)=O(x,y)-I_2(x,y) \quad \text{[Equation 2]}$$

Figure 9:
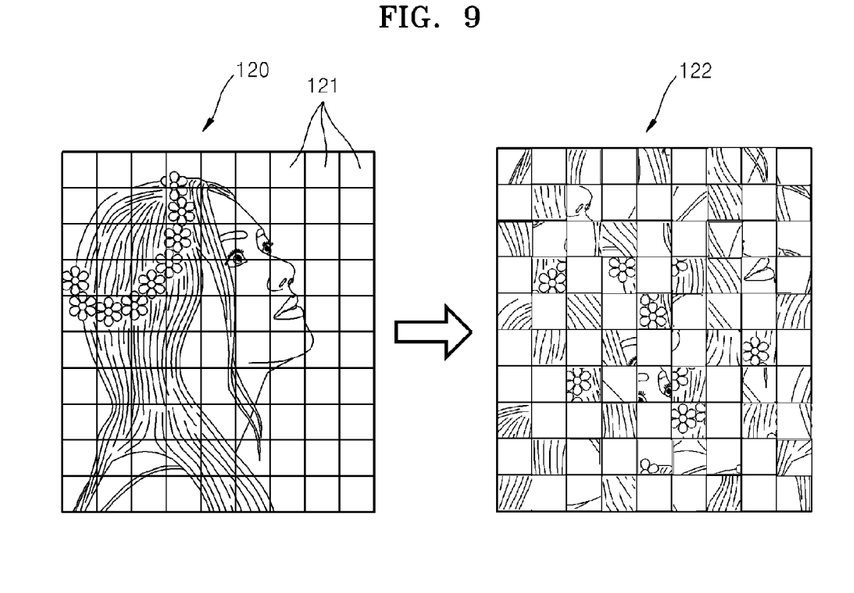
FIG. 9 is a conceptual view for explaining an encoding operation of an image processing method using a security function, according to another embodiment.

FIG. 9 is a conceptual view for explaining an encoding operation of an image processing method using a security function, according to another embodiment.

Referring to FIG. 9, according to the image processing method of the current embodiment, an original image 120 is divided into a plurality of sub-regions 121 and locations of the sub-regions 121 are randomly changed, thereby obtaining an encoded image 122. For decoding, the changed locations of the sub-regions 121 are restored to obtain the original image 120.

Figure 10:
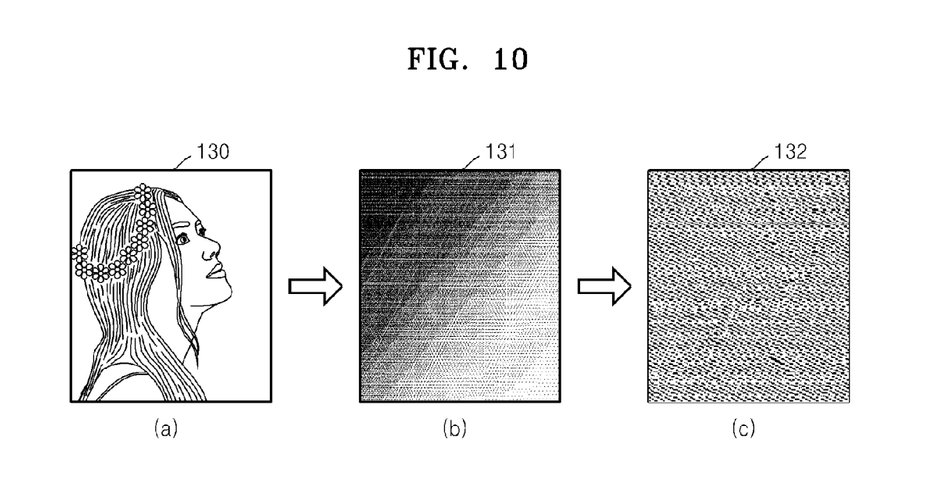
FIG. 10 is a conceptual view for explaining an encoding operation of an image processing method using a security function, according to another embodiment.

FIG. 10 is a conceptual view for explaining an encoding operation of an image processing method using a security function, according to another embodiment.

Referring to FIG. 10, the image processing method according to the current embodiment includes encoding using a random phase pattern and a displacement of a combination correlation plane. A second image 131 is an image formed by adding the displacement to an original image 130, and a third image 132 is a phase modulation image of the second image 131.

Figure 11:
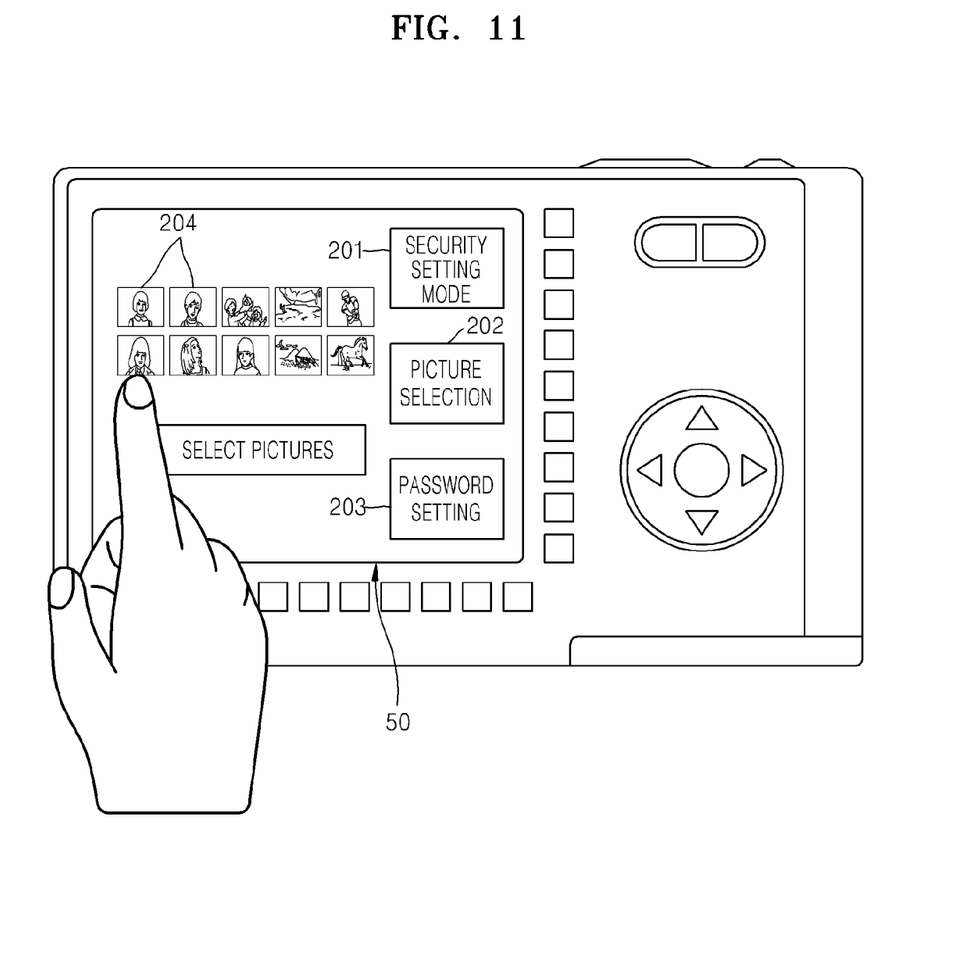
FIG. 11 illustrates an example of setting a security mode in the image processing apparatus of FIG. 1.

FIG. 11 illustrates an example of setting a security mode in the image processing apparatus of FIG. 1.

A user may set an image processing apparatus with a security mode by selecting a security mode setting mode 201 displayed on a touch screen 50. Once the image processing apparatus is set with the security mode, images captured thereafter are encoded and the encoded images are stored in a storage unit.

For images that are stored while not being encoded because they have been captured when the image processing apparatus is not set with a security mode, the user may select desired images for encoding later. If the user selects a picture selection menu 202 displayed on the touch screen 50, images 204 corresponding to the image data stored in the storage unit are displayed on the touch screen 50 as illustrated in FIG. 11.

When some or all of the images 204 displayed on the touch screen 50 are selected and a password setting menu 203 is executed, a password may be input. When the user inputs a password, image data corresponding to the selected images are combined with the password and encoded in such a way that the images corresponding to the image data are changed.

Figure 12:
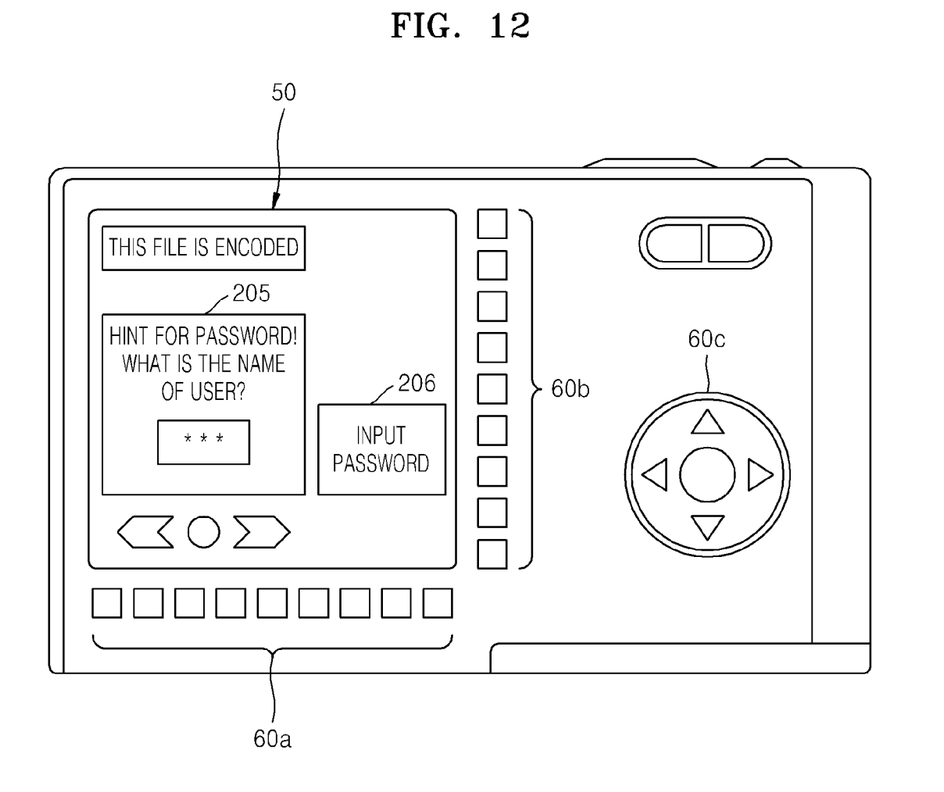
FIG. 12 illustrates an example of a security function that is performed in the image processing apparatus of FIG. 1.

FIG. 12 illustrates an example of a security function that is performed in the image processing apparatus of FIG. 1.

When a user identifies an image corresponding to image data with an image processing apparatus or an external device to which the image is transferred, a reduced image 205 corresponding to the image data is displayed on the touch screen 50 as illustrated in FIG. 12. The security setting unit 47 of the image processing apparatus of FIG. 1 identifies a security mode setting key included in the image data, and when the image data is encoded, a characteristic string representing that the image data is encoded is output as illustrated in FIG. 12.

The reduced image 205 may be a thumbnail image or a screennail image. The thumbnail image refers to a small image displayed for image search on the touch screen 50. Unlike the thumbnail image, the screennail image is an image that is compressed to a size suitable for the size of a visible region of a display region and is attached to an end of a JPEG file format. In a reproduction mode, the screennail image is restored and displayed on the touch screen 50.

When image data is encoded, deformation of an image corresponding to an image region and deformation of a reduced image corresponding to a reduced image region such as a thumbnail region or a screennail region are simultaneously performed.

The reduced image 205 displayed on the touch screen 50 may be encoded to display hint information for remembering a password. If a password that is input when a user executes a password input menu 206 matches the password of image data, an image corresponding to the image data may be displayed on the touch screen 50 after the encoded image data is decoded by the encoding processor 45.

The user may input a password by manipulating execution buttons 60a and 60b or a menu button 60c of the image processing apparatus.

Although in the embodiment illustrated in FIG. 12, when image data is encoded, a reduced image is also deformed, other embodiments may not be so limited. For example, in another embodiment, when image data is encoded, the image corresponding to the image region is deformed and the image corresponding to the reduced image region is not deformed. In this case, the user may identify image data in advance through the reduced image.

As described above, for apparatuses and methods for image processing using a security function according to various embodiments, image data corresponding to an image captured in a security mode is encoded. Thus, the image can be seen only after the encoded image data is decoded. Even when the encoded image data is transferred to outside the image processing apparatuses, the image cannot be seen until the encoded image data is decoded by inputting a password. Thus, a security function is enhanced.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. The words "mechanism" and "element" are used broadly and are not limited to mechanical or physical embodiments, but may include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". It will be recognized that the terms "comprising," "including," and "having," as used herein, are specifically intended to be read as open-ended terms of art.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

What is claimed is:

1. An image processing apparatus comprising:
    a user input unit that converts input manipulation of a user into an input signal;
    a security setting unit that sets a security mode and a password based on the input signal;
    an imaging unit that captures an image and converts the image into image data;
    an encoding processor that encodes the image data in such a way that:
        the image data is combined with the password and the image corresponding to image data is deformed when the image processing apparatus is set in the security mode by the security setting unit; and
    a storage unit that stores the image data,
        wherein the image data comprises a reduced image region that stores a reduced image generated by reducing a size of an image corresponding to the image region, and
        wherein the image data is encoded by the encoding processor in such a way that the reduced image region comprises hint information for remembering the password.

2. The image processing apparatus of claim 1, further comprising a display unit that displays images corresponding to image data stored in the storage unit, wherein
    the encoding processor encodes the image data in such a way that image data corresponding to at least some of the images displayed by the display unit is combined with the password, and images corresponding to the image data are changed.

3. The image processing apparatus of claim 1, further comprising a compression processor that generates compressed image data by compressing the image data, wherein the compressed image data is stored in the storage unit.

4. The image processing apparatus of claim 3, further comprising a display unit that displays an image,
    wherein the compression processor extracts the compressed image data to generate image data, and
    when the image data is encoded, the security setting unit compares an input signal transmitted by the user input unit with the password of the image data, and
    when the input signal matches the password, the encoding processor decodes the encoded image data and the display unit displays an image corresponding to the decoded image data.

5. The image processing apparatus of claim 4, wherein the image data further comprises a user region and an image region, and the password is stored in the user region of the image data.

6. The image processing apparatus of claim 5, wherein the encoding processor adds deformation data to the image region to encode the image data.

7. The image processing apparatus of claim 6, wherein the encoding processor subtracts the deformation data from the image region of the image data to decode the encoded image data.

8. The image processing apparatus of claim 5, wherein the encoding processor divides an image corresponding to the image region into sub-regions and changes locations of the sub-regions to encode the image data.

9. The image processing apparatus of claim 8, wherein the encoding processor restores locations of the sub-regions to decode the encoded image data.

10. The image processing apparatus of claim 5,
    wherein when the image data is encoded by the encoding processor, the image corresponding to the image region is deformed and the reduced image corresponding to the reduced image region is maintained.

11. The image processing apparatus of claim 5,
    wherein when the image data is encoded by the encoding processor, the image corresponding to the image region is deformed and the reduced image corresponding to the reduced image region is deformed.

12. An image processing method comprising:
    setting a security mode and a password;
    converting a captured image into image data;
    when the security mode is set, encoding the image data in such a way that:
        the image data is combined with the password and an image corresponding to the image data is deformed; and
    storing the image data, wherein the image data comprises a reduced image region that stores a reduced image generated by reducing a size of an image corresponding to the image region, and wherein the image data is encoded in such a way that the reduced image region comprises hint information for remembering the password.

13. The method of claim 12, further comprising displaying images corresponding to the image data stored in the storage unit, wherein in the encoding, image data corresponding to at least some of the images displayed are combined with the password and images corresponding to the image data is deformed.

14. The method of claim 12, further comprising compressing the image data.

15. The method of claim 14, wherein the image data further includes a user region and an image region, and the password is stored in the user region of the image data.

16. The method of claim 15, further comprising:

extracting the image data stored while being compressed; and when the image data is encoded, receiving input of a user, wherein when the input of a user matches the password of the encoded image data, the encoded image data is decoded and an image corresponding to the decoded image data is displayed.

17. The method of claim 16, wherein the encoding comprises adding deformation data to the image region, and the decoding comprises subtracting the deformation data from the image region of the encoded image data.

18. The method of claim 16, wherein the encoding comprises dividing an image corresponding to the image region into a plurality of sub-regions and changing locations of the sub-regions, and the decoding comprises restoring the locations of the sub-regions.

19. The method of claim 15, wherein the encoding is performed in such a way that the image corresponding to the image region is deformed and the reduced image corresponding to the reduced image region is deformed.

* * * * *